Jan. 10, 1939.  E. F. GUTH  2,143,149
LIGHT DIRECTING SHIELD
Filed Dec. 23, 1937  2 Sheets-Sheet 1
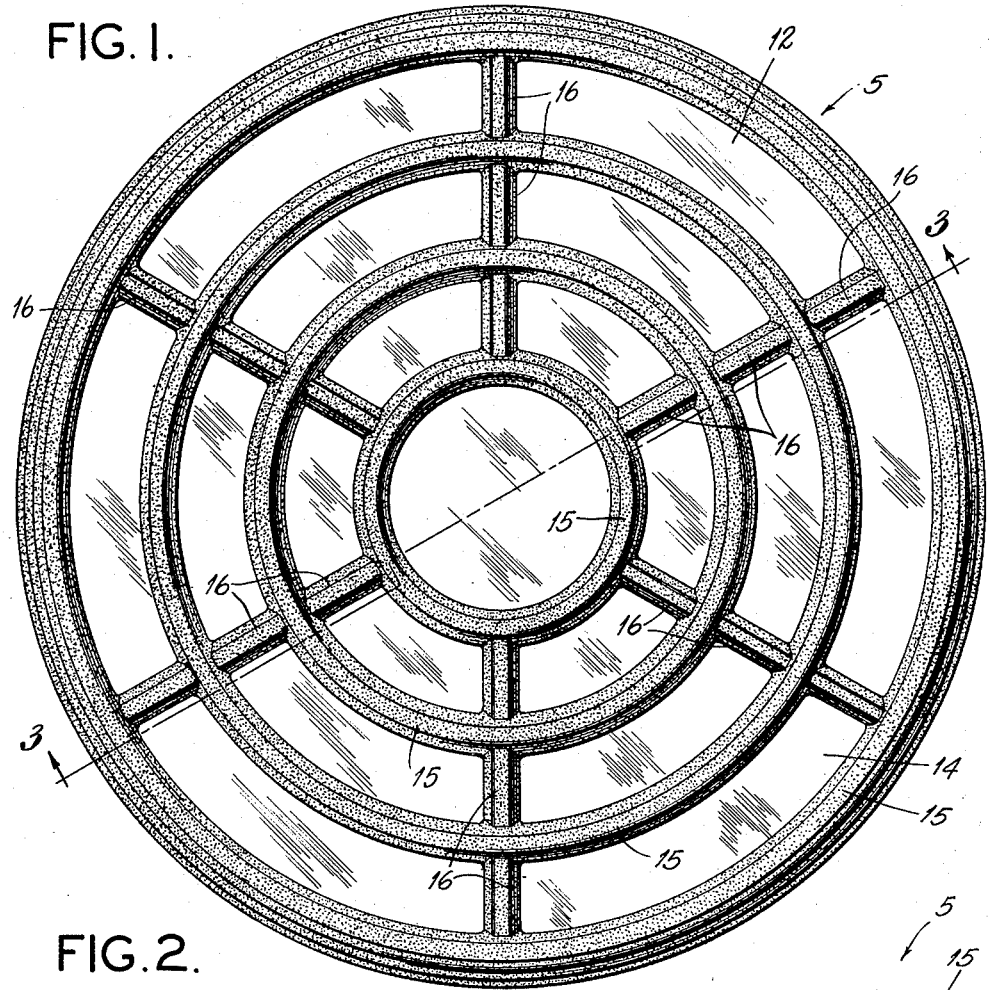
FIG. 1.
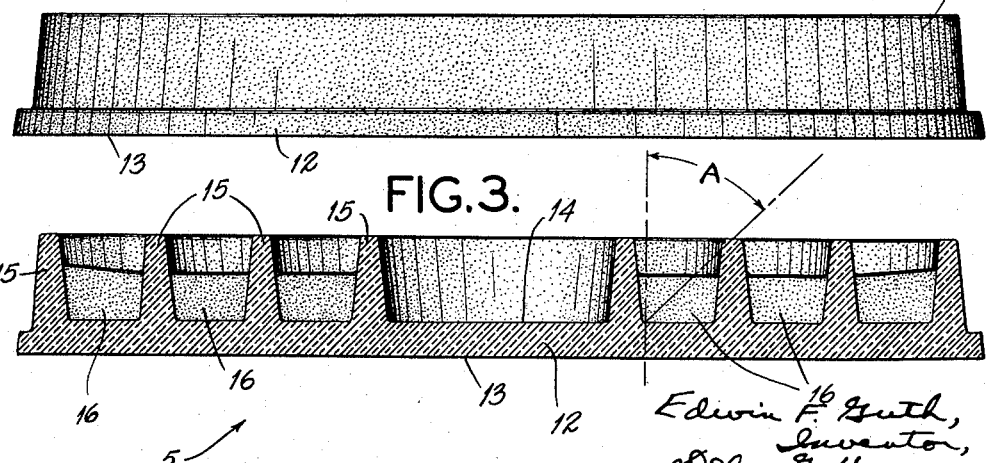
FIG. 2.
FIG. 3.
Edwin F. Guth,
Inventor,
Delos F. Haynes,
Attorney.

Jan. 10, 1939.　　　　E. F. GUTH　　　　2,143,149
LIGHT DIRECTING SHIELD
Filed Dec. 23, 1937　　　2 Sheets-Sheet 2
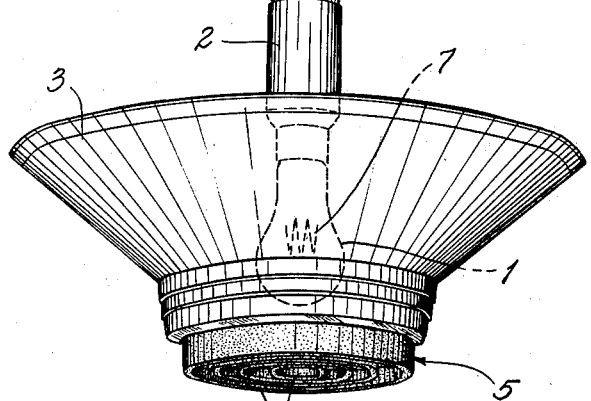
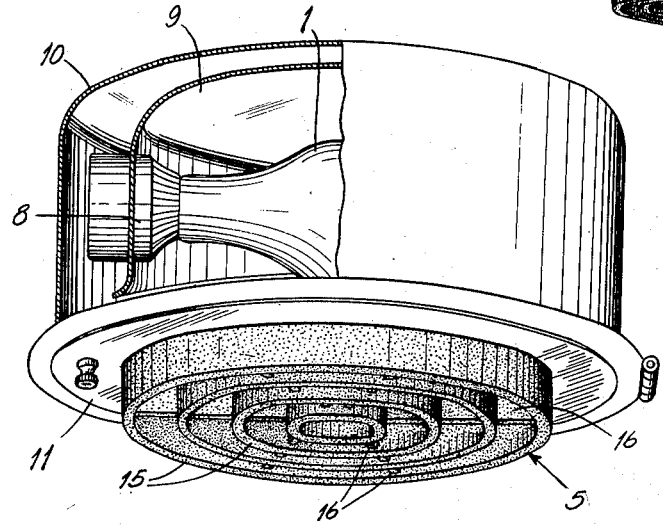

Patented Jan. 10, 1939

2,143,149

UNITED STATES PATENT OFFICE 2,143,149

LIGHT DIRECTING SHIELD

Edwin F. Guth, Webster Groves, Mo.

Application December 23, 1937, Serial No. 181,278

1 Claim. (Cl. 240—78)

This invention relates to light shields, and with regard to certain more specific features, to light directing shields.

Among the several objects of the invention may be noted the provision of a light directing shield which is adapted to minimize the glare of a high intensity light source, such as an incandescent filament, but which at the same time is capable of transmitting substantially all of the light incident upon it; the provision of a light shield of the class described wherein direct light rays from a light source are distributed and directed in such a manner that they travel, after passing through the shield, in a large number of directions, but in a predetermined manner; the provision of a light shield of the class described which, when placed in a customary position in a room, for example, before a high-intensity light source, substantially eliminates all direct light rays from the source at angles greater than about 45° from the vertical; the provision of a light shield of the class described which when placed before a light source exhibits a highly pleasing, softly illuminated appearance, but which nevertheless transmits a relatively great amount of light; and the provision of a light shield of the class described which is relatively simple and economical in construction. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which are illustratied several of various possible embodiments of the invention, Fig. 1 is a bottom plan view of a light shield made in accordance with the present invention;

Fig. 2 is a side elevation of the light shield of Fig. 1;

Fig. 3 is an enlarged cross section taken substantially along line 3—3 of Fig. 1; and, Figures 4 and 5 are perspective views of typical lighting fixtures embodying the light shield of the present invention.

Similar reference characters indicate corresponding parts throughout the several views of the drawings.

The present invention relates to light shields which are used for the purpose of directing and modifying the light emitted from high intensity sources, such as incandescent filament electric lamps. The present invention finds use in connection with many types of illuminating fixtures, one of its principal uses being in connection with direct-indirect fixtures of the type illustrated in Fig. 4, in which an electric light bulb is indicated at numeral 1. Suspended from a cylinder 2 around the neck of bulb 1 is a conical reflector 3, of the type ordinarily provided for indirect illumination. Suspended in the bottom part of the reflector 3 is a light shield 5 which is constructed in accordance with the present invention. In the fixture as thus shown, the light from the filament 7 of the bulb 1 is directed upwardly by the reflector 3 to be reflected by the ceiling and thus provide a source of indirect light. Additional light from the bulb 1 passes through the shield 5, by means of which shield it is modified and directed, to constitute non-glaring direct illumination. The light shield of the present invention is also useful in connection with direct illumination fixtures, of the type shown in Fig. 5, for example. Fig. 5 shows a fixture for recessed mounting, comprising a bulb 1 supported in a socket 8 mounted on the wall of a cup-shaped reflector 9, all of which are enclosed in a casing 10. A flange 11 at the front of the casing 10 holds a light shield 5 in accordance with the present invention. In this fixture, light from the filament of bulb 1 is directed outwardly by the reflector 9 through the shield 5, which modifies and directs it, to again constitute non-glaring direct illumination.

In the past, the light shields used in connection with fixtures such as those illustrated in Figures 4 and 5 have comprised simply frosted, pebbled, etched, or similar irregular-surfaced glass sheets. A disadvantage incident to the use of such former shields is that they are relatively inefficient in the transmission of light, too much light being reflected in the wrong directions by the irregular surface employed to diffuse the light. A further disadvantage of such shields is that they present a relatively large area of rather intensely illuminated surface, which is of even luminous intensity or brilliance across the entire surface. Such a relatively large, evenly illuminated surface is not entirely pleasing to the eye, and is, by reason of its uniform brilliance, frequently rather glary or troublesome to the beholder.

The light shield of the present invention, as indicated at numeral 5, accomplishes a diffusion of the direct light rays from the filament 7 of the bulb 1, and the rays from the reflectors 3 and 9, but without inefficiency, and presents a decorative appearance in which the brilliance of the shield to the beholder may vary over the surface of the shield, in a pattern or design that is pleasing to the eye and less glary.

The light shield of the present invention, which is shown in greater detail in Figures 1, 2, and 3, comprises a transparent plate or sheet 12, which may have any desired outer periphery in order to cooperate with the fixture for which it is designed. For example, in Fig. 1, the sheet 12 is circular, and this is the form that it usually takes. Other shapes may be provided at will, however. One surface 13 of the sheet 12 is plane, as is the parallel other surface 14 of the sheet 12.

Extending from the surface 14 are a plurality of concentric, circular ribs or flanges or fins or like members 15. In the embodiment of Figures 1, 2, and 3, the ribs 15 are four in number, but the number of ribs 15 is entirely optional with the constructor of the shield. The ribs 15 need not be circular, but may be of any conformation, provided they accomplish the obscuring function hereinafter mentioned. Also depending from the lower surface 14 of the sheet 12 are a plurality (six, in the present embodiment) of radial ribs 16, that intersect the concentric circular ribs 15, running from the innermost rib 15 to the outermost rib 15. The radial ribs 16 are usually, although not necessarily, of lesser depth than the circular ribs 15, being, in the embodiment shown, only about half the depth of said circular ribs 15.

The ribs 15 are desirably provided with considerable depth, in order to obtain the full benefit of the invention, and should be deep enough so that an angle A (Fig. 3) between a straight line drawn from the bottom edge or root of one rib 15 to the nearest top edge or crest of an adjacent rib 15, and a line normal to the plane of the sheet 12, is less than about 45°. For example, in Fig. 3, the ribs 15 are shown as approximately three times as deep as their average thickness. This depth of the ribs provides that, from a normal angle of vision, each rib constitutes a shield interposed against a direct view of the surface of the sheet 12 between that rib and next inner rib, and thus obscures it. In the embodiment shown in Fig. 3, the ribs 15 taper in thickness from a widest portion where they join the plate 3 to a narrowest portion at their lowermost edges. Such tapering, while advantageous in that it permits easy removal of the shield from its mold, is not entirely necessary to the present invention, and most of the benefits of the invention can be realized if the sides of the ribs 15 are parallel.

In the preferred embodiment of the invention, the entire shield 5, including both the plate 12 and the ribs 15, and 16, is cast or formed as an integral unit from heat-resisting crystal glass. Crystal glass is preferred because of its high transparency (it nearly approaches the ideal of perfect transparency) but other suitable transparent materials may likewise to used. The radial ribs 16 aid in removing the cast shield from a mold, and strengthen it against breakage during its annealing, in addition to adding to the appearance of the shield.

In the finished shield, all of the surfaces of the ribs 15 and 16 are made diffuse, as by etching or sand-blasting or enameling, while the remaining surface 14 and the entire surface 13 of the sheet 12 are left clear and transparent. In Figures 1, 2, and 3, stippling is used to indicate the diffuse surfaces, while the absence of stippling indicates that the surface is clear and transparent. This arrangement of clear and diffusing surfaces in the shield constitutes one of the principal advantages of the present invention, in the manner in which it modifies the light from the light source.

For example, to a beholder of a fixture embodying such a light shield, no direct view of the light source is possible from any ordinary angle of view. By making the depth of the ribs such as to cause the angle A (Fig. 3) to be less than the order of 45°, the observer, unless he be directly under or in front of the fixture and looking directly into it, never sees the glaring light source directly. Instead, he sees the sides of ribs 15 and 16, which glow pleasantly with a brilliance that is sufficiently low easily to be tolerable to the eyes. The ribs glow because they are basically of a translucent character, because of their diffuse surfaces, and because they absorb and refract light from the source through said diffuse surfaces. At the same time, the shield is highly efficient in its light transmission, because many direct rays from the source pass directly and without diffusion through the transparent surfaces 13 and 14 of sheet 12; these direct rays, however, are so controlled in their direction of propagation as to be unnoticeable to the beholder, except under abnormal circumstances.

Because the sheet 12 thus performs only a light-transmitting function, and itself exerts little directional effect on rays passing through it, it may sometimes be dispensed with, and the light shield thus constructed as an assembly of translucent ribs. This is particularly feasible when a synthetic plastic material is used in place of glass for the construction of the light shield. The present invention of course includes such a synthetic plastic shield, as it is immaterial to the present invention of what material the shield is made, as long as it has the requisite optical properties.

It is to be understood that the light shield of the present invention may be used with any type of lighting fixture, the fixtures shown in Figures 4 and 5 being by way of example only. For example, the shield may be used in built-in installations without employing any other fixture means in cooperation therewith.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

A light shield comprising a plurality of spaced concentric circular cylindrical translucent but not transparent material ribs, and means interconnecting said circular ribs, each of said ribs being of substantially the same axial length and all of the ribs having edges disposed in substantially the same plane, the depth of said ribs and the spacing of adjacent ribs being such that each angle formed in each instance, for adjacent pairs of ribs, between a line intersecting the axis of the assembly, the root of one rib, and the crest of the next adjacent rib, and an intersecting second line drawn normal to the said plane of the edges of all of the ribs, is no greater than the order of 45°.

EDWIN F. GUTH.